A. FOUBERT.
Alcohol Still.
No. 67,863.
Patented Aug. 20, 1867.
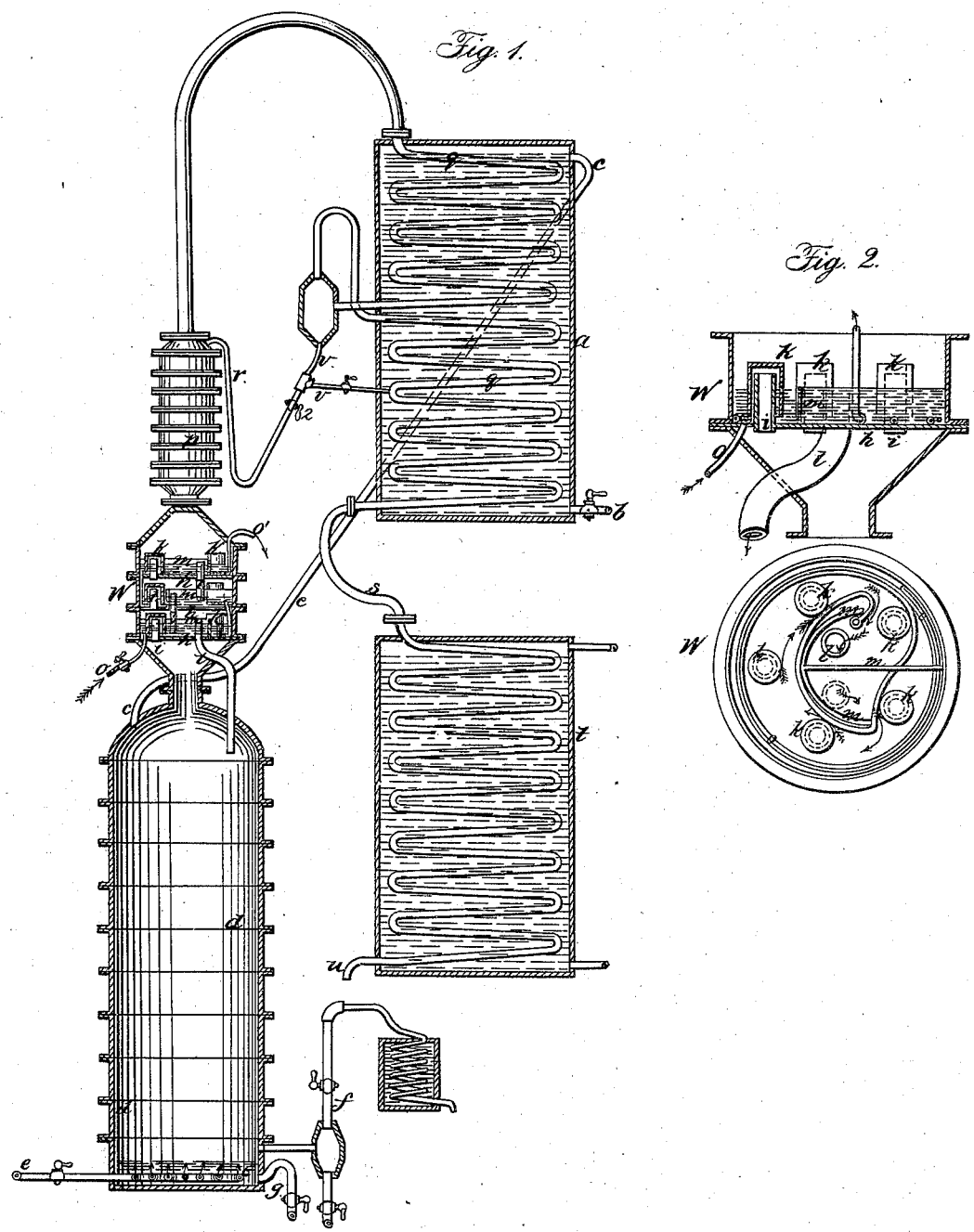
Witnesses:
Inventor:

United States Patent Office.

ANDRE FOUBERT, OF NEW YORK, N. Y.

Letters Patent No. 67,863, dated August 20, 1867.

---

IMPROVED APPARATUS FOR DISTILLING AND RECTIFYING SPIRITS.

---

*The Schedule referred to in these Letters Patent and making part of the same.*

---

TO ALL WHOM IT MAY CONCERN:

Be it known that I, ANDRÉ FOUBERT, of the city and State of New York, have invented and made a certain new and useful improvement in the Distillation and Rectification of Spirits; and I do hereby declare the following to be a full, clear, and exact description of the said invention, reference being had to the annexed drawing, making part of this specification, wherein—

Figure 1 is a vertical section of the apparatus employed by me.

Figure 2 is a vertical section, and

Figure 3 is a sectional plan of my improved agitating condenser.

Similar marks of reference denote the same parts.

The nature of my said invention consists in a peculiar arrangement and construction of distilling apparatus for the continuous distillation and partial rectification of spirits, whereby the operation can be performed much more rapidly and perfectly than heretofore, and the watery portions pass away at one end of the apparatus while the spirit passes off at the other end, the operation being continued indefinitely.

In the accompanying drawing, $a$ is a vessel into which the liquid containing the spirit is to be pumped continuously through the pipe $b$. This vessel $a$ also acts as a partial condenser, as hereafter described. $c$ is a pipe allowing the partially heated water and spirit to run gradually from the vessel $a$ into the still $d$, in which is a coil of pipe, $e$, that is perforated for jets of steam to enter the still and heat the contents. $f$ is a testing apparatus, by which to see whether the spirit is all evaporated from the water running into the still and thereby be enabled to regulate the supply from $c$ and the delivery-cock $g$, so that nothing but water will pass away. The height of the still $d$ is such that watery particles will condense in the upper part and run back, and the spirit coming in from $c$ will all be vaporized in running down and reaching the liquid in the bottom. The vapors pass into the next vessel, W, which I term the agitating condenser. This is formed of two or more diaphragms, $h$, through which pass the vapor pipes $i$, over which are caps $k$, the edges of which are below the level of the liquid resting upon the diaphragm $h$, so that the vapors passing through violently agitate the liquid and cause the watery portions of the vapors to be condensed while the spirit passes on. The liquid above each diaphragm runs gradually from the overflow pipe $l$ of the highest diaphragm to the liquid on the next one below. A division, $m$, upon the surface of each diaphragm, causes the circulation of the liquid around upon the same from the point of supply to that of delivery to the next diaphragm below. There is a water pipe passing in at $o$, and coiled around upon the surface of the lowest diaphragm, and passing to a coil on the next diaphragm, and so on, and passing out at the pipe $o'$. Through this water is caused to circulate so as to cool the liquid that rests upon the respective diaphragms, so as to promote the condensation of the watery portions and the rectification of the spirit. From this agitating condenser I pass the vapors through the rectifying column $p$ that is formed in the usual manner to condense and return the watery portions while the vapors go on to the condensing-worm $q$ in the vessel $a$. This condensing-worm $q$ is divided so that the portions of the spirit which may not be very pure are returned through the siphon $r$ to the upper part of the rectifying column $p$, while the spirit vapors pass off through the pipe $s$ to the condenser $t$ that is supplied with cold water, and the spirit is drawn or runs away by the pipe at $u$. If it is desired to prevent the return of a portion of the condensed vapors through the siphon $r$ I close the cock 2 and open the cock in the pipe $v$.

What I claim, and desire to secure by Letters Patent, is—

1. The agitating condenser formed with the diaphragms $h$, the vapor pipes $i$, the caps $k$, and the pipe $o$, supplying water for cooling the liquid on the diaphragms, as and for the purposes specified.

2. I claim the arrangement of the still $d$, the agitating condenser W, the rectifying column $p$, and the condensers $a$ and $t$, as and for the purposes specified.

In witness whereof I have hereunto set my signature this twenty-second day of January, A. D. 1867.

ANDRE FOUBERT.

Witnesses:
LEMUEL W. SERRELL,
CHAS. H. SMITH.